United States Patent
Sachs (10) Patent No.: US 7,058,832 B2
(45) Date of Patent: Jun. 6, 2006

(54) IDLE POWER REDUCTION FOR STATE MACHINES

(75) Inventor: Howard G. Sachs, Los Altos, CA (US)

(73) Assignee: Telairity Semiconductor, Inc., Santa Clara, CA (US)

( * ) Notice: Subject to any disclaimer, the term of this patent is extended or adjusted under 35 U.S.C. 154(b) by 508 days.

(21) Appl. No.: 10/284,623

(22) Filed: Oct. 30, 2002

(65) Prior Publication Data

US 2003/0140219 A1    Jul. 24, 2003

Related U.S. Application Data

(63) Continuation-in-part of application No. 10/056,326, filed on Jan. 23, 2002.

(51) Int. Cl.
G06F 1/28 (2006.01)
G06F 1/32 (2006.01)
G06F 1/30 (2006.01)

(52) U.S. Cl. .................. 713/322; 713/300; 713/320

(58) Field of Classification Search ........... 713/322; 712/320, 245
See application file for complete search history.

(56) References Cited

U.S. PATENT DOCUMENTS 5,349,670 A * 9/1994 Agrawal et al. ............ 712/245
5,778,251 A * 7/1998 Kuroiwa et al. ............ 710/14
6,073,223 A * 6/2000 McAllister et al. ......... 711/167

* cited by examiner

Primary Examiner—Lynne H. Browne
Assistant Examiner—Stefan Stoynov
(74) Attorney, Agent, or Firm—Townsend and Townsend and Crew LLP (57) ABSTRACT

A state machine provides a power reducing capability by turning off a clock signal to a memory which stores the state of the state machine. Preferably, the state machine is connected to receive information from an external circuit, typically a system to be controlled by the state machine. The state machine includes a programmable memory in which each row stores a word representing output information as a sequence of bits. It also includes a register which stores the state of the state machine when the memory is not active. The state machine includes a selection circuit which selects a next state of the state machine. When the next state of the state machine is selected to be the same as the previous state the clock signal to the memory is turned off, enabling reduced power consumption by the state machine.

12 Claims, 7 Drawing Sheets

0000 Do nothing
0001 Reset all flags
0010 Set all flags
.
.
.
100X Flag 0
101X Flag 1
110X Flag 2
111X Flag 3

X=0 Reset flag
X=1 Set flag

IDLE POWER REDUCTION FOR STATE MACHINES

CROSS-REFERENCE TO RELATED APPLICATION

This is a continuation-in-part of "General Purpose State Machine," U.S. patent application Ser. No. 10/056,326, filed Jan. 23, 2002.

BACKGROUND OF THE INVENTION

This invention relates to state machines, and in particular to reducing the power consumption of state machines which are implemented as a portion of an integrated circuit or in other formats.

A state machine, also known as a finite state machine, responds to events by moving from state to state according to a formal set of rules. These rules are typically customized for the particular problem to be solved. State machines can be used generally in any electronic system, for example, a general purpose computer system, a special purpose computer system, or a control system that control products such as home appliances or industrial products. The state machine typically includes three components: (1) a set of states, (2) a set of events, and (3) a mapping from each state or event to a corresponding action. This set of states requires that in any given time the machine be in a single state. The events are then actions which the machine recognizes. Typically, an event will represent an external input. The state machine, however, may also generate events internally which cause changes of state. Finally, the mapping from each state to a corresponding action means that the action may cause a transition to a different state, provide a particular output signal, or otherwise indicate transition to the successor state.

Computation by the state machine begins in the start state, but then the state machine will change to a new state caused by external signals provided to the state machine or an internal transition. There are many variants of state machines, for example, state machines can have actions or provide outputs which are based on transitions (Mealy machine) or based upon states (Moore machine). A state machine can be considered to be an abstract model of a system, for example, a physical, biological, mechanical, electronic, or software system.

A state machine can be used to model interaction between a system and its environment. Its state is a way of remembering what has occurred so far. A transition occurs when an event in the environment causes the system to change state. Given a sequence of inputs, a state machine will produce a sequence of outputs that is dependent upon the initial state, the transition function which maps each current state and input to a next state, and an output function that maps each current state to an output. In Moore machines the output is a function of only the current state, while in Mealy machines the output is a function of the current state and the input.

It has been common in integrated circuit technology since the 1980's for distributed state machines to be used rather than a central control engine. This has resulted primarily because of the availability of integrated circuit technology and increasing performance requirements. By distributing state machines across an integrated circuit with appropriate control points in appropriate locations, shorter electrical connections for critical paths results, improving performance.

In most state machines a control RAM or ROM allows programming the state machine. This memory typically loops in the same state waiting for an external signal to change or some internal condition to change to cause the state machine to transition to the next state. In many applications for state machines, because the speed of the integrated circuit is so fast in comparison to the external events triggering changes in state, a significant amount of time is spent in this idle loop. In this loop, usually the state machine keeps accessing the same memory location. This usually causes all of the bit lines to be precharged at the beginning of each clock cycle, and then the selected lines are discharged. In addition, other elements of the state machine may also need to be activated, further dissipating power. Because the output data remains the same, these actions dissipates unnecessary power.

What is needed is a state machine which can be operated in a manner so that when the input data has not changed, and therefore the state of the machine will not transition to a new state, power consumption is reduced.

BRIEF SUMMARY OF THE INVENTION

This need in the prior art is addressed by implementation of a general purpose state machine which has a power saving circuit and is readily useful for many different integrated circuit based systems. The state machine provided employs general purpose components such as flags, counters, and programmable logic, enabling it to be easily reused, even if maintained in hard form. In a preferred embodiment the state machine includes a programmable memory, operating in response to a first clock signal, which stores a plurality of words and supplies one of those words in response to an address signal. The state machine also includes a control circuit operating in response to a second clock signal. The control circuit receives first and second address signals from a word in the programmable memory, and receives signals from an external circuit. The signals from the external circuit cause the control circuit to select either the first address or the second address. Of course in simpler embodiments, the state machine may not have the capability of branching, and thus receive only one address. In these type state machines the choice will be whether to move to the new address or remain at the present address for another cycle.

A clock circuit, which in a preferred embodiment is connected to be controlled by an output signal on one of the lines from the control circuit, detects when the signal selecting one of the words in the programmable memory changes (or does not change). If the selection signal does not change, the clock circuit disables the first clock signal, thereby reducing power consumption. On the other hand, if the signal from the control circuit does change, the clock circuit enables the first clock to allow the state machine to operate normally.

Typically the memory is a programmable memory, for example a ROM, PROM, SRAM, DRAM, or other memory, which has a plurality of rows. Each row stores a word (sequence of bits), and a word in the programmable memory is supplied to the output terminals of the memory in response to an address signal selecting that word (row). Some bits from the output signal are used for control of the state machine, while other bits are provided to the external circuit.

The control circuit receives the output signal from the first multiplexer and also receives at least one sets of bits from the programmable memory, each set representing an address of another word in the memory. In response to the signals from the multiplexer, the control circuit provides a signal which selects one of the words in the programmable memory. The word selected corresponds to the address provided by some of the bits in the addressed word (or other signals indicative of a request that the state not change). Other bits from the selected word are then provided on various output lines to control the external circuit and control the state machine.

In general, the sizes of the multiplexers, sizes of the programmable memory, and other associated circuitry will be optimized for the particular application within which the state machine is employed. The state machine itself may be maintained in a "soft" or "hard" form. Examples of soft form are RTL and some HDL formats in which no physical information about the layout is maintained. In contrast, in hard form the state machine is maintained as a collection of polygons representing the shapes of regions for an integrated circuit. In soft form the particular state machine may be optimized for area, speed, power consumption, or other desired variables. In hard form the layout can be manually optimized for reuse in the same or similar technologies.

The invention provides substantial power saving in comparison to prior art state machines. Because the design is generally optimized to that required by a specific application, it is faster than previous state machines. It is also more flexible because it allows any number of external inputs, either by expanding the size of the first multiplexer, or supplying such additional inputs to programmable logic or other pre-state machine logic. The state machine also provides the ability to perform branch operations. It can change state without relying on hardwired logic. Further description of the advantages and structure of the state machine of this invention is found below.

DETAILED DESCRIPTION OF THE PREFERRED EMBODIMENTS

Figure 1:
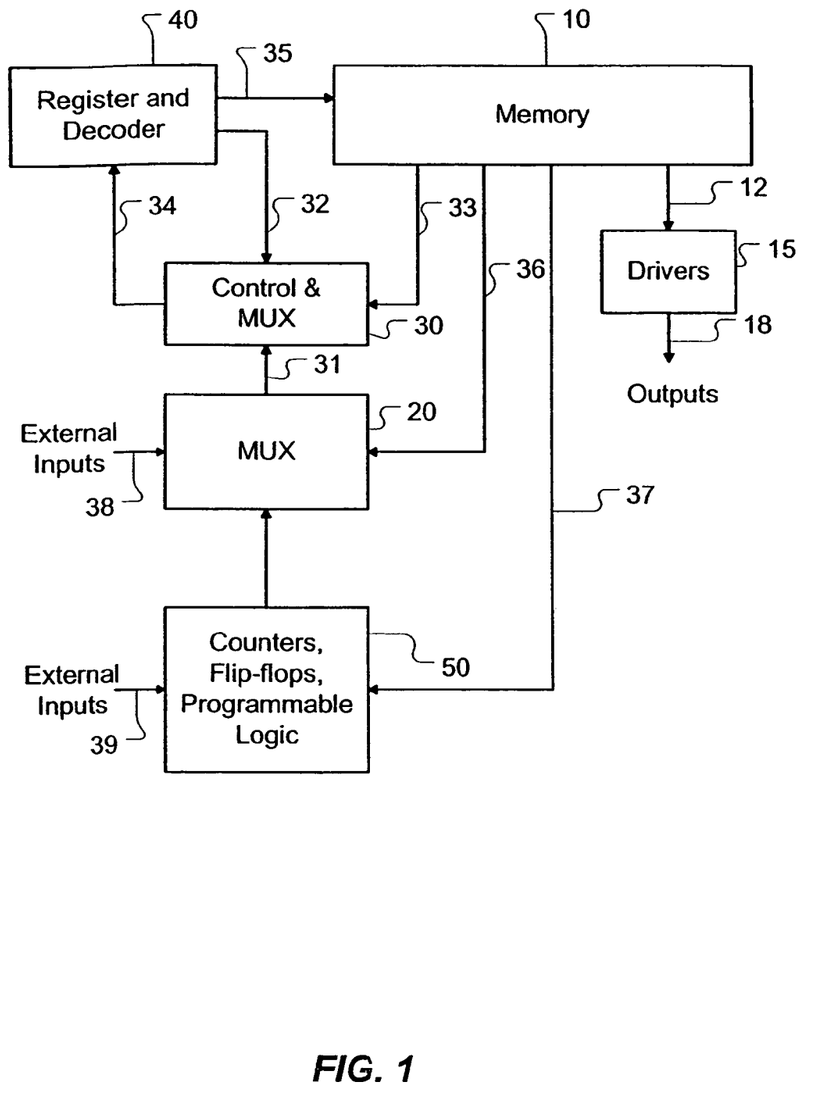
FIG. 1 is a simplified block diagram of a general purpose state machine according to a preferred embodiment.

FIG. 1 is a block diagram of the general purpose state machine as implemented according to a preferred embodiment of this invention. As will be described below, the embodiment depicted enables a five-bit state machine, that is, one with thirty-two states. Of course, greater or lesser numbers of states may be implemented by making appropriate changes in the depicted components. On the other hand, because one of the advantages of the state machine described herein is its ability to function in many different environments, once the hardware layout is optimized for power consumption, speed, or other variable, use of less than all of the circuitry depicted may be advantageous, in contrast generating a new layout for the integrated circuit.

The basic components depicted in FIG. 1 will be described generally, as to their function, and then more details provided as to the implementation. Particularly important components for an understanding of FIG. 1 are memory 10, a first multiplexer 20 and a control circuit 30. These will be explained first, followed by a discussion of the remaining components depicted.

Memory 10 is a programmable memory which may be volatile or nonvolatile. In the depicted embodiment, memory 10 is a ROM programmable by a mask during the semiconductor fabrication process used to manufacture the circuit shown in FIG. 1. In one embodiment the ROM consists of 32 rows (words) of information, with each row having 48 columns (bits), to thereby provide storage for 32 48-bit words. Each row in the memory corresponds to a state in the state machine. The particular state selected, that is, the particular word addressed, is controlled by control and multiplexer circuit 30 in response to signals received on line 31. The signal on line 31 will cause control circuit 30 to select one of the two inputs 32 or 33 and provide the information from the selected input to the register/decoder 40 as an address over line 34. (As described below, input terminals 33 may provide more than one address.) In the example depicted in FIG. 1, selection of input 32 results in one address being provided via register/decoder 40 to ROM 10, while selection of line 33 results in a different address being provided via control circuit 30, decoder 40, and line 35 to ROM 10. The received address is provided to ROM 10 via register/decoder 40. While the discussion above used the term "row" to describe the "state" of the state machine, the memory may be organized in any desired manner so portions of the memory other than rows may represent the "state" of the state machine.

In response to the address, the register/decoder selects one of the rows of ROM 10. For the example depicted, assume control circuit 30 placed the address "row 25" on input line 34, then register/decoder 40 will cause the next address provided to ROM 10 to be row (word) 25. In other words, the input signal on line 31 to control circuit 30 will cause the ROM 10 to change states from the state represented by the previously addressed row to the state represented by the word stored in row 25. This change in state will result in new output data being provided on line 12, as well as on lines 33, 36 and 37. Typically, the output signals will be provided to drivers 15 for supply either in pulse form or latched form to various external circuitry coupled to the drivers 15 by lines 18.

As mentioned, the output signal on line 34 from control circuit 30 provides the next address for the state machine. Control circuit 30 itself is controlled by multiplexer 20, and by counters, flip-flops and programmable logic circuitry 50. The mux and control circuit 20 receives external input signals 38, signals from circuitry 50, and internal control signals from memory 10 over lines 36. Similarly, circuitry 50 receives external input signals 39 and internal input signals from memory 10 over lines 37. The combination of all of the external and internal input signals to mux 20 and circuitry 50 determine the selection signal on line 31.

In some applications for the state machine depicted in FIG. 1, the external signals provided on lines 38 and 39 will not change frequently, or at least not change as frequently as the clock signals being provided to control the overall system. For example, if the state machine depicted is being used for control of an appliance or a machine, there will be a considerable delay, from the perspective of the clock signals provided to the state machine, between changes on the external input lines 38 and 39. In this situation, the state of the state machine will remain unchanged from one clock cycle to the next. Although the state itself does not change, the state machine will be consuming considerable electrical power.

The power consumption occurs because the memory 10, which allows programming the state machine, will loop in the same state waiting for an external signal to change or some internal condition to change to cause the state machine to transition to the next state. In this loop, the state machine will repeatedly access the same memory location. This usually causes all of the bit lines to be precharged at the beginning of each clock cycle, and then the selected lines are discharged. In addition, the word lines and the decoders must be activated, also dissipating power.

Figure 2:
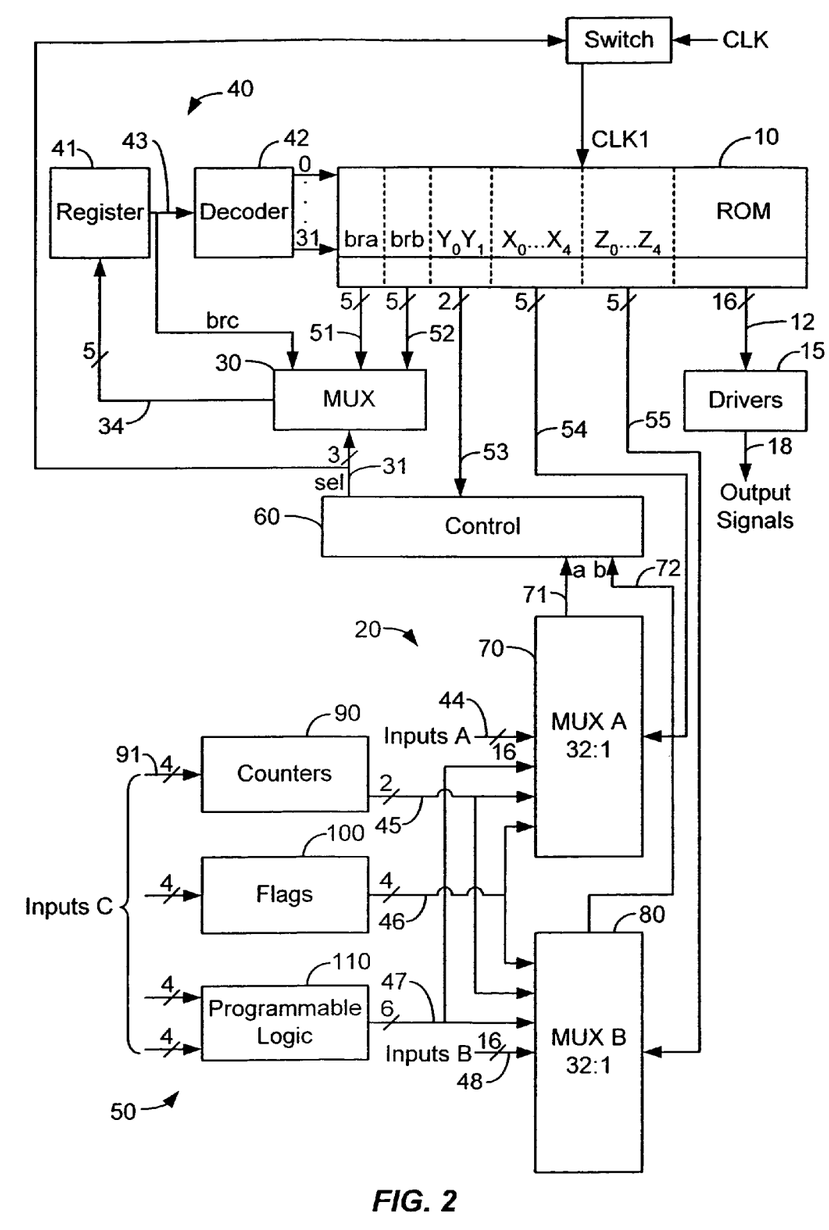
FIG. 2 is a more detailed block diagram.

FIG. 2 is a more detailed block diagram illustrating one implementation of the conceptual level diagram of FIG. 1, and illustrating the power reduction circuitry. Components in FIG. 2 have been given numerical designations to reflect corresponding components in FIG. 1. In FIG. 2, the register/decoder 40 is shown in more detail to consist of register 41 and decoder 42 coupled to each other by interconnection 43. As shown by the diagram, interconnection 43 is a five-bit signal provided from register 41 to decoder 42. The corresponding "width" of other interconnections shown in FIG. 2 is designated in the same manner throughout the diagram. Of course, more or fewer bits may be provided among the various interconnections, and serial connections can be employed in place of the parallel connections depicted.

Decoder 42 is coupled to ROM 10 with 32 address lines designated 0 to 31 in the diagram. The five-bit address signal supplied on line 43 to decoder 42 results in the selection of one of lines 0 to 31. The 48 bits of the selected word are then applied to the 48 output lines from the ROM 10. These 48 output lines include a five-bit signal branch a "bra" on lines 51 and a five-bit signal branch b "brb" on lines 52. Signal branch c "brc" indicative of remaining in the previous state is also supplied to mux 30 on line 32. As explained in conjunction with FIG. 1, the three control wires 31 will cause multiplexer 30 to select among input signals 32, 51 and 52. ROM 10 also provides a two-bit signal Y on lines 53 to control circuit 60. As will be discussed this signal enables different branching operations. In addition, five-bit signals X and Z are provided on lines 54 and 55, respectively, to partially control multiplexer A 70 and multiplexer B 80. This control is discussed further below.

The particular manner in which control circuit 60 provides the output signals on line 31 to control mux 30 is discussed next. Muxes 70 and 80 are coupled to receive external input signals A and B directly and external input signals C applied to counters 90, flags 100, and programmable logic 110. In addition, mux 70 receives the X input signals from ROM 10, while mux 80 receives the Z input signals from ROM 10. Thus, muxes 70 and 80 are controlled by "internal" signals from ROM 10, to select desired ones of the external signals. Of course other, or additional, signals from other types of input logic such as filters, memories, converters, etc. can also be provided to muxes 70 and 80.

The combination of external and internal input signals to mux 70 causes it to provide an output signal "a" on line 71. Similarly, the combination of external and internal input signals to mux 80 cause it to provide an output signal "b" on line 72. In a manner described further below, the combination of signals a and b on lines 71 and 72, together with signal Y on line 53, causes control circuit 60 to produce an appropriate output signal on lines 31. As shown in FIG. 2, lines 31 preferably consists of three lines. This output signal causes mux 30 to select among its various input signals 32, 51, and 52 and supply it over lines 34 to register 41, one of these addresses. In a preferred embodiment, a signal on one of lines 31 selects input bra 51, a signal on another of lines 31 selects input brb 52, while a signal on the other of the three lines 31 selects input brc—indicating that the state of the state machine is to remain unchanged. This results in the selection of a particular word within ROM 10 on the next clock signal.

The particular manner in which mux 70 and 80 provide the output signals on lines 71 and 72 is discussed next. As depicted, each of muxes 70 and 80 is coupled to receive external signals which arrive on lines 45, 46, 47, 44 (mux A only), and 48 (mux B only). In the example of FIG. 2, there are 16 lines designated by reference numerals 44 and 48, two lines by reference numeral 45, four lines designated by reference numeral 46, and six lines designated by reference numeral 47. Of course, it will be appreciated that more or fewer lines may be employed. In addition to receiving these external signals, muxes 70 and 80 also receive "internal" select signals over lines 54 and 55. The internal select signals arriving at the muxes 70 and 80 over lines 54 and 55 are control signals supplied directly from ROM 10.

The input signals on lines 45 originate from counters 90. The initial count values and control information are provided over lines 91. These are discussed in FIG. 4. The programmable logic provides signals on lines 47, and is discussed in conjunction with FIG. 5. The input signals to muxes 70 and 80 arriving on lines 46 originate from flag circuits 100. The flag circuits are discussed in FIG. 6. The result of all of the external input signals and the internal input signals causes control circuit 60 to provide an output signal on line 31 which selects one of the three addresses on lines 32, 51 and 52 provided to mux 30.

The idle power reduction circuitry in FIG. 2 operates by detecting the state of the signal 31 supplied from control circuit 60 to mux 30. As described, signal 31 is indicative of whether the next state of the state machine is to be state bra, brb, or brc. As shown by FIG. 2, state brc is an output signal from register 41 indicative that the state of the state machine is not to change in the next cycle. In other words, in the preferred embodiment, the state of the line 31 selecting brc is monitored. A more detailed explanation of the operation of the power reduction circuitry is provided below in conjunction with FIG. 7.

Figure 3:
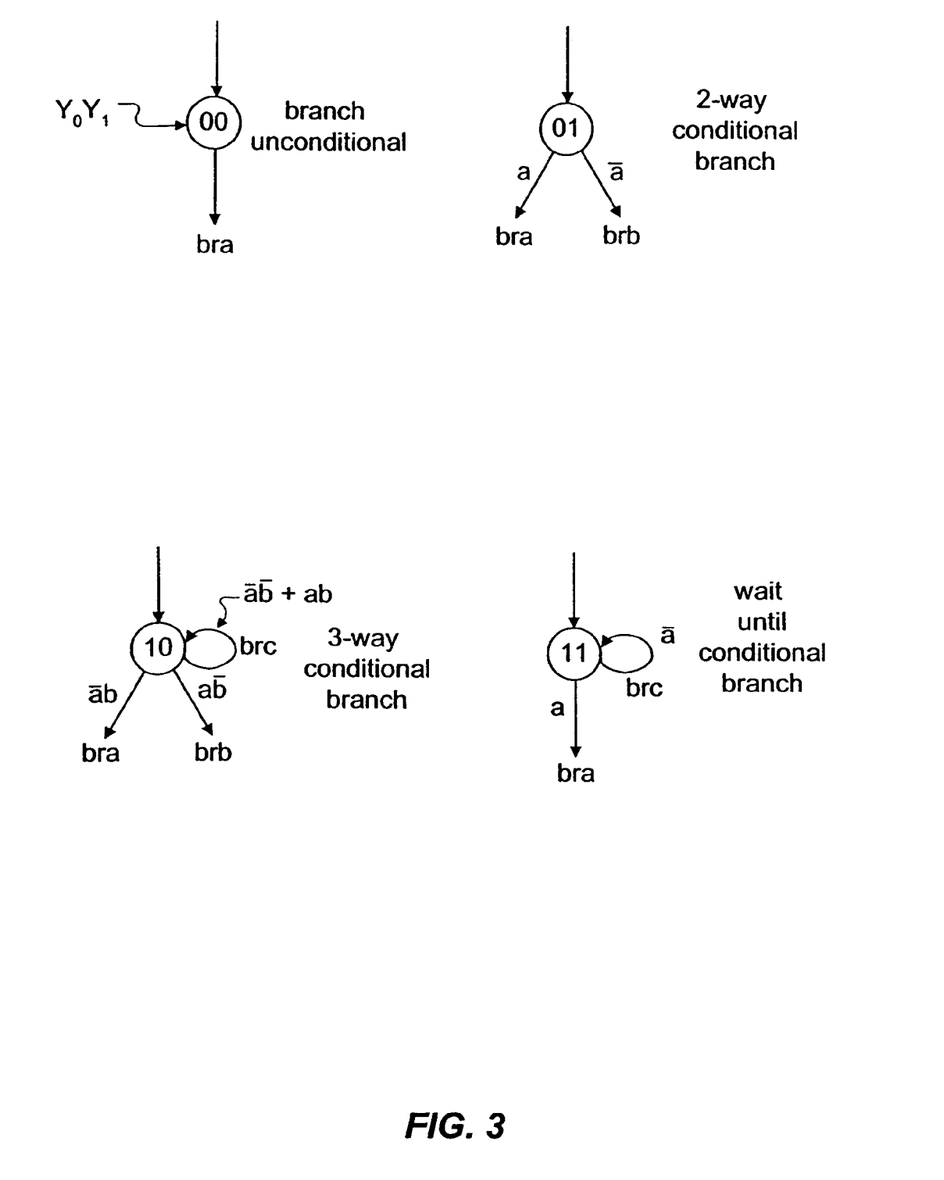
FIG. 3 illustrates branch conditions and address selection by the system of FIG. 2.

The flexibility of the general purpose state machine described herein can be better understood with reference to FIG. 3. FIG. 3 illustrates the branch conditions implemented by the system illustrated in FIG. 2. In FIG. 3 there are four different branch operations provided by the general purpose state machine, and the choice of the particular branch operation is determined by the Y0 and Y1 bits stored in ROM 10. A branch unconditional operation as shown in the upper left portion of FIG. 3. If each of Y0 and Y1 are 0, an unconditional branch operation is performed to select address bra.

In the upper right portion of FIG. 3, a two-way conditional branch operation is illustrated. This operation occurs when Y0 is 0 and Y1 is 1. In this circumstance the a output of multiplexer 70 (FIG. 2) will cause control circuit 60 to supply a signal on line 31 to mux 30 which selects either branch a (line 51), and therefore next address bra, or branch b (line 52) and therefore address brb.

The lower left corner of FIG. 3 illustrates a three-way condition branch operation in which one of address bra, address brb, or address brc (return to the same state) is selected. In this circumstance the output signal a on line 71 from mux 70 and the output signal b on line 72 from mux 80 are both used.

Finally, in the lower right portion of FIG. 3 a wait until conditional branch is depicted. There, as shown, if Y0 and Y1 are each 1, the state machine shifts to address bra or address brc, depending upon the a signal on line 71.

Thus, in summary, the state machine provides state control in the manner of enabling unconditional branches, conditional branches either two ways or three ways, and branches under control of the counters, flags or external inputs. The machine also enables the state machine to change states upon receipt of an external input.

The structure depicted in FIGS. 1 and 2 enables a state machine with 32 states, with additional states being provided if a larger ROM is employed in place of the 32-word ROM 10 depicted. As discussed, the choice of states is determined by all of the external and internal inputs. In particular, the output of the state machine is determined as follows, where a and b are the signals on lines 71 and 72, and $Y_0 Y_1$ are the signals on lines 53:

| $Y_0 Y_1$ | Select bra | Select brb | Select brc |
|---|---|---|---|
| 00 | 1 | — | — |
| 01 | a | $\bar{a}$ | — |
| 10 | $\overline{ab}$ | $a\bar{b}$ | $\overline{ab}+ ab$ |
| 11 | a | — | $\bar{a}$ |

Of course, other codes can be used in place of those described above.

Some states for the state machine can be selected in multiple ways. The equations below illustrate the different conditions that can be used to select a particular word. For example, as shown in the first equation, the select input on line 31 will choose the address bra in each of three conditions, that is, if Y0 and Y1 are 0, or if Y1 is 1 and input a is 1, or if Y0 is 1, Y1 is 0, input a is 0 and input b is 1. The remainder of the equations can be similarly understood.

$$\text{select } bra = \bar{Y}_0\bar{Y}_1 + Y_1 a + Y_0\bar{Y}_1 ab$$

$$\text{select } brb = \bar{Y}_0 Y_1 \bar{a} + Y_0\bar{Y}_1 a\bar{b}$$

$$\text{select } brc = Y_0\bar{Y}_1(\overline{ab}+ab) + Y_0 Y_1 \bar{a}$$

Figure 4:
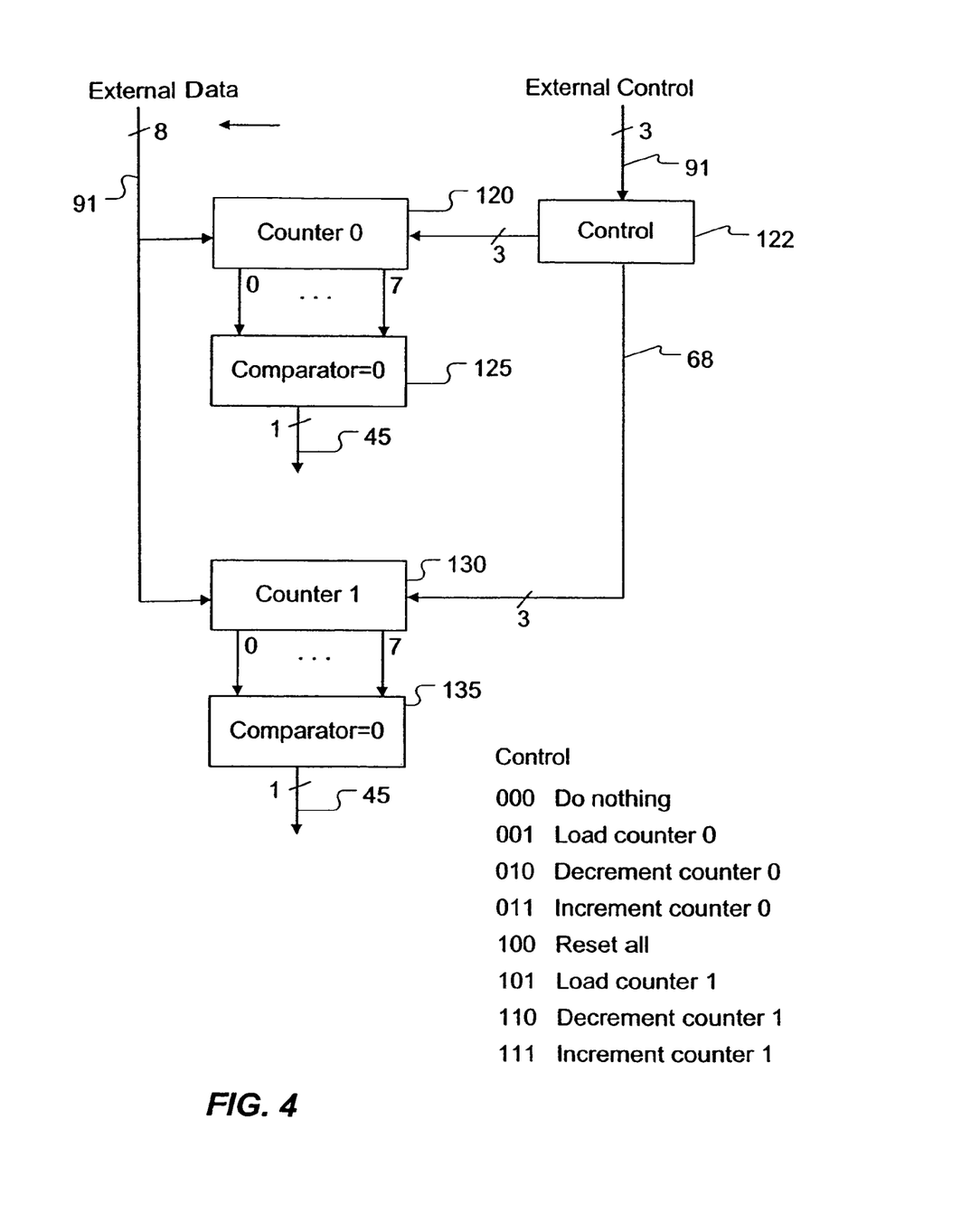
FIG. 4 illustrates details of the counter of FIG. 2.

FIG. 4 is a more detailed diagram of counter 90 shown in block form in FIG. 2. The combination of the circuitry shown in FIG. 4 forms counters 90. As shown in FIG. 4, a counter 120 is coupled to receive eight bits of data over lines 91. This data includes three bits of control information provided to control circuit 122. As shown by the lower right-hand corner of FIG. 4, the control information received on lines 91 to control circuit 122 will cause the eight bits of data provided to counter 120 to cause no change by the counters 120 (if the control bits are 000). If the control bits are 001, then counter 120 will be loaded with the bits received on lines 91. A control circuit output of 010 will cause the counter 120 to begin decrementing, while a control signal of 011 will cause the counter to begin incrementing. The counter output is provided to a comparator 125 which compares its stored value of 0 with the data received from counter 120. When counter 120 reaches a count of 0, comparator 125 will record the correct comparison and provide an output signal on line 45. Counter 130 and its comparison circuit 135 operate in the same manner as counter 120 and its control circuit 125.

Figure 5:
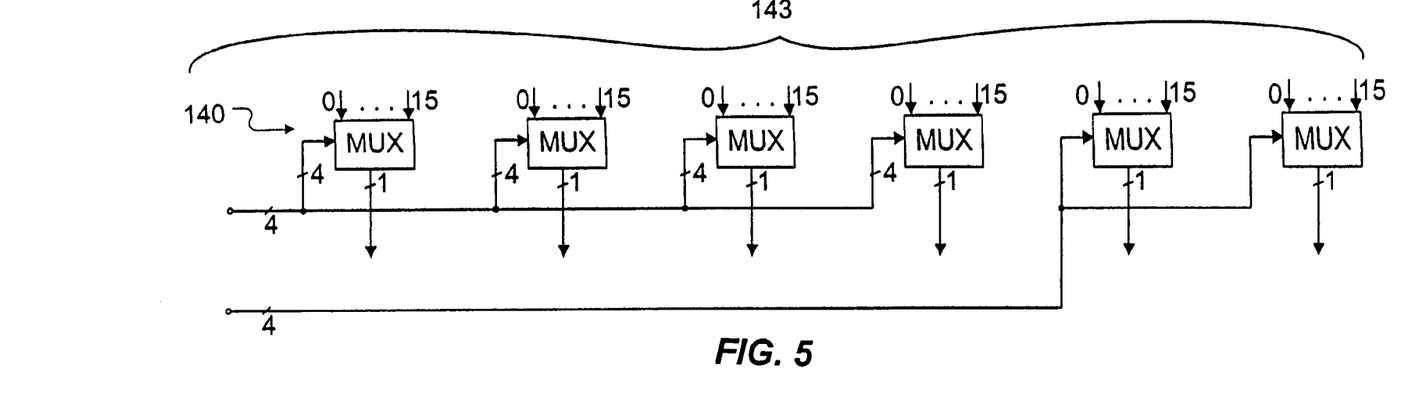
FIG. 5 is a diagram illustrating the programmable logic of FIG. 2.

FIG. 5 illustrates an implementation of programmable logic 110 depicted in block diagram form in FIG. 2. As shown in FIG. 5, the programmable logic preferably consists of a series of six multiplexers 140, configured logically as two PLA circuits, one having four product term outputs and one having two product term outputs. Each of the two circuits receives four input signals. Each multiplexer has 16 input terminals, and each multiplexer receives a four-bit input signal from the external input c. The four-bit input signals selects a particular input from each multiplexer and supplies that as an output signal, one output signal being supplied from each mux 140 on a corresponding output line 143. The programmability is achieved by connecting each of the input terminals of each multiplexer to either ground or a potential source.

Figure 6:
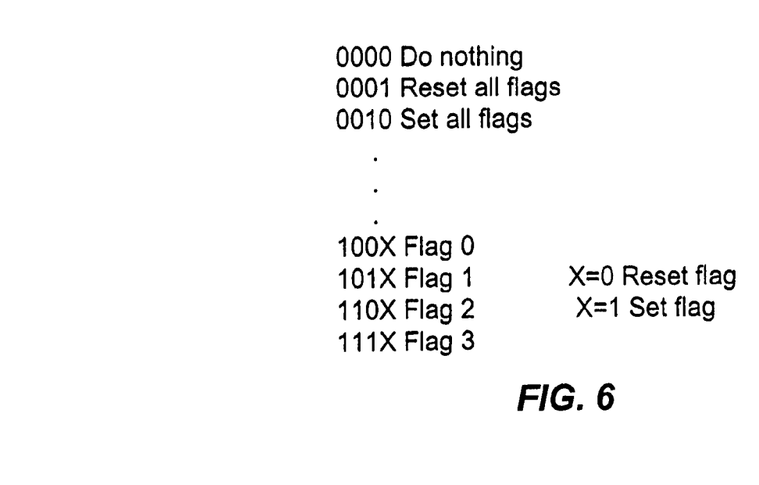
FIG. 6 illustrates details of the flags.

FIG. 6 illustrates the operation of the flags 100 shown in block form in FIG. 2. As shown in FIG. 6, four control bits select the operation of the flags 100. If all control bits are 0, then no action occurs. If only the least significant bit is a 1, then all flags are reset. If the next least significant bit is a 1, then all flags are set. The bottom four rows of FIG. 6 show the addressing of a specific flag and the setting or resetting of a specific flag based upon the least significant bit. For example, to address flag 2, the most significant bits will be 110, with the setting or resetting of the flag controlled by the fourth bit, as also shown in FIG. 6.

Figure 7:
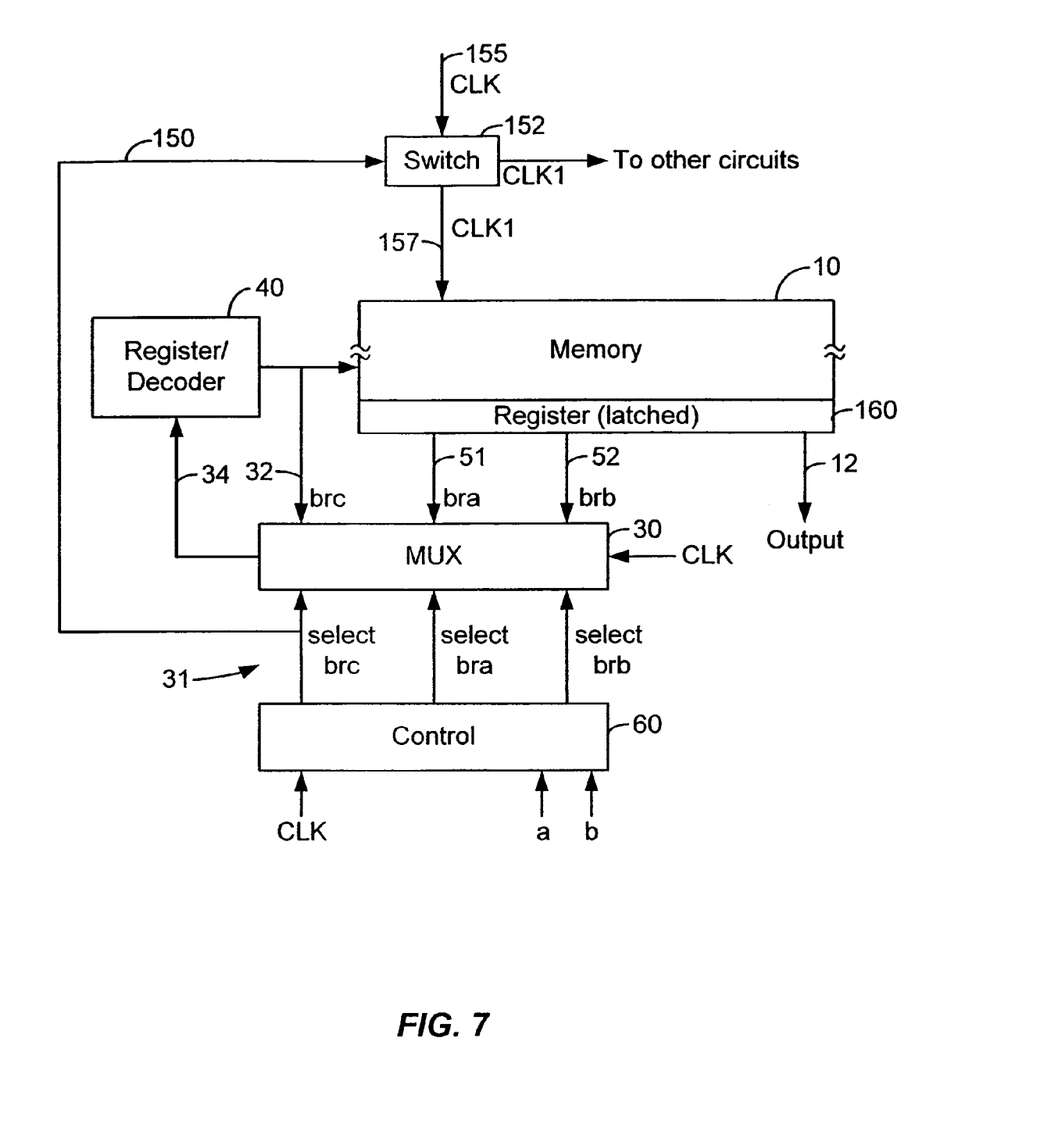
FIG. 7 is a more detailed diagram of the power saving circuitry.

FIG. 7 is a diagram illustrating in more detail the power reduction circuitry. The components in FIG. 7 have been given reference numerals to match those of the corresponding components of FIGS. 1 and 2. As shown in FIG. 7, control circuit 60 controls mux 30 to cause it to select one of the three input signals bra, brb, and brc, supplied to mux 30. The mux selects one of those signals and provides it on output line 34 to register 40, where it thereby selects the next state to be output from memory 10. Control circuit 60 selects the state by applying a signal on one of the three control lines 31 designated select bra, select brb, and select brc in FIG. 7. Importantly, if control circuit 60 selects brc, it is indicative that the state of the state machine is not to change. In other words, control 60 providing a signal on the brc line to mux 30 indicates that the state machine is to remain in the same state as before.

The signal on line 150 is used to control switch 152. Switch 152, which can consist of a simple logic gate, or provide more complex functionality, enables clock signal CLK 155 to be gated to control memory 10. When enabled, this clock signal is designated CLK 1 and has a reference number 157. Thus, when line 150 is active, no clock signal is provided to the memory 10, thereby reducing its power consumption. When line 150 is not active, then CLK1 is provided to the memory.

Of course, the polarities of the signals described may be reversed. In the previous description the clock signal is always provided except when a signal is present on line 150. In an alternate embodiment, line 150 may be active as long as no signal is present on the select brc line between control 60 and mux 30. In such circumstances, then the gate 152 will always pass the clock signal CLK except when the state of line 150 is "off." Furthermore, if it is desired to allow the memory to remain active in the same state for more than one cycle before being disabled, a counter or other logic can be incorporated within the switch 152. Of course, other approaches are also possible by comparing the states of the select bra, select brb, and select brc line to determine whether the control signal from the control circuit 60 to mux 30 is of an appropriate nature to disable clocking of memory 10.

The controlled CLK1 signal can also be used as the clock signal for other components, such as decoder 40, or even external circuits if power is to be further conserved. This option is illustrated in FIG. 7 by the second arrow designating that CLK1 may be provided "to other circuits." Note that in FIG. 7 the regular clock signal CLK is used to drive the MUX circuit 30 and the control circuit 60, so they are not disabled. This permits them to detect whether the address for the "next" word has changed or not.

In an alternate embodiment, detection of whether the address for the "next" word has changed or is to remain at the same word is determined by an additional bit added to each word in the memory. For those states of the state machine where the machine is to "loop" until an event happens this extra bit can be used to control the switch 152. This embodiment is shown in FIG. 8.

Figure 8:
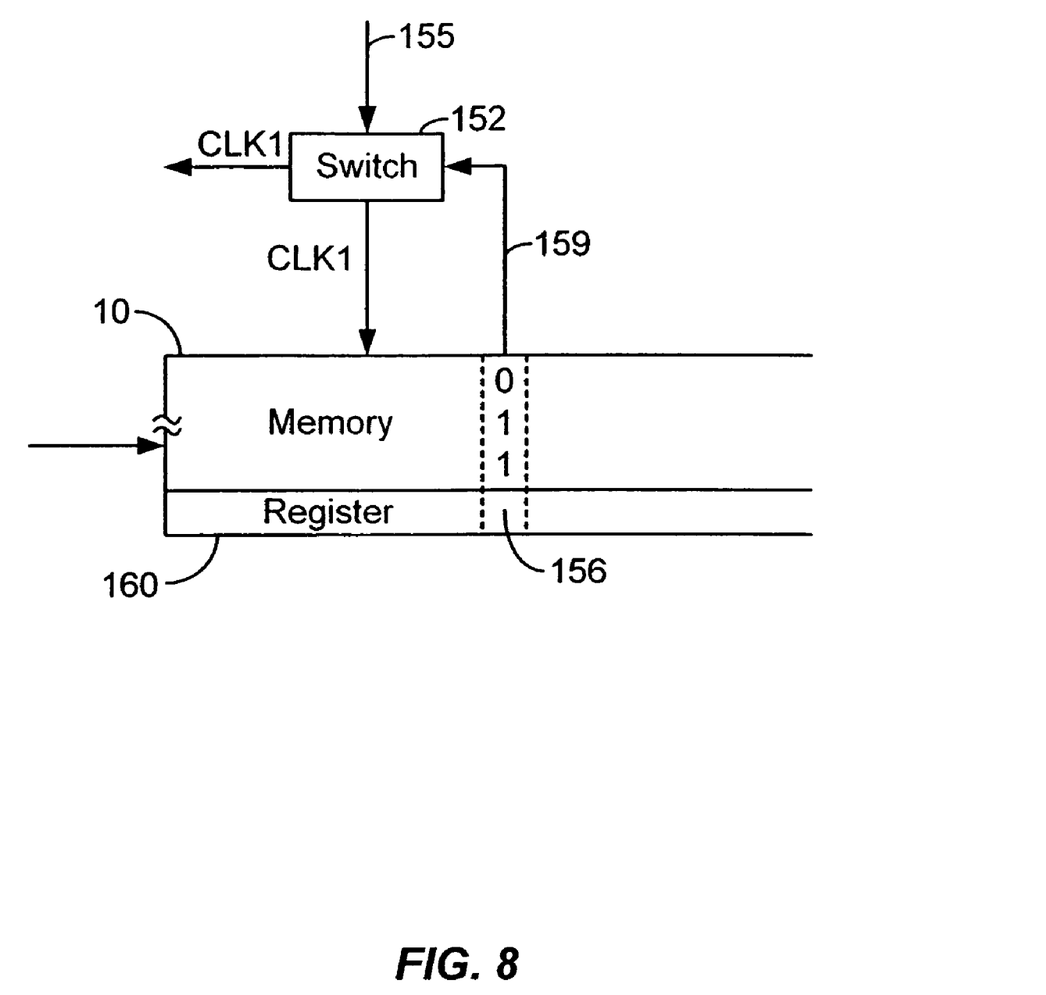
FIG. 8 is a diagram illustrating an alternate embodiment of FIG. 7.

In FIG. 8 the extra bit is shown by column 156. The output state of this bit is provided over line 159 and used to control switch 152. For example, if the designer of the control system within which the system shown in FIG. 8 wishes for the state machine to remain in a loop at a particular word until a particular event occurs, the bit may be set to "1." This will disable the switch 152 and power down those portions of the system connected to receive the CLK1 signal until some other event occurs to choose an address for a different word in the memory.

Because when the memory is not receiving clock signals, its state would not be detectable, a register 160 is provided in conjunction with memory 10 to store the state of the memory. Thus, the contents of register 160 provide the output signal 12 indicative of the state of the state machine. The contents of register 160 are latched, so that they are available even when memory 10 is not being clocked.

A general purpose state machine has been described which can be implemented as a portion of a larger integrated circuit. The state machine can be optimized for particular applications, for example, by reduction of area of the resulting integrated circuit, power consumption, or a combination of factors. The general purpose state machine can be implemented in software, firmware or hardware form.

The preceding has been a description of the preferred embodiment of a general purpose state machine. It will be appreciated that numerous modifications may be made from the described implementation, for example, by using the controlled clock signal to control the power consumption of other components in addition to the memory, all without departing from the scope of the invention as defined by the appended claims.

What is claimed is:

1. A state machine comprising:
a memory storing a plurality of words representative of states of the state machine, each word having a plurality of bits, a word from the memory being supplied in response to a selection signal, the memory connected to receive a first clock signal;
a first plurality of external input terminals for receiving information from an external circuit;
a control circuit having a plurality of input terminals, at least some of which are coupled to the external input terminals to receive the information therefrom, the control/circuit supplying a first output signal;
a selection circuit connected to receive the first output signal from the control circuit and in response provide the selection signal which when received selects one of the words in the memory and thereby causes selected interconnections in the memory to receive power;
a clock circuit connected to receive the first output signal, the clock circuit disabling the first clock signal when the selection signal selecting one of the words in the memory selects the same word as in an immediately previous selection, the clock circuit thereby causing the selected interconnections in the memory to not receive power, and thereby reduce power consumption of the memory.

2. A state machine as in claim 1 wherein:
the memory is also connected to supply some of the bits of each word selected to the selection circuit; and
the first output signal determines whether the selection circuit selects either (1) the same word that it selected in the immediately previous selection, or (2) whether to use the bits from the memory as a next address for a word in the memory.

3. A state machine as in claim 2 wherein the memory supplies bits to provide a first address and a second address to the selection circuit, and the selection circuit selects one of (1) the same word that it selected in the immediately previous selection, or (2) one of the first address and the second address.

4. A state machine as in claim 1 wherein the control circuit and the selection circuit are each connected to receive a second clock signal which is not controlled by the clock circuit.

5. A state machine as in claim 1 wherein the memory further comprises a register which stores a word from the memory which has been most recently supplied in response to an address signal.

6. A state machine comprising:
a programmable memory storing a plurality of words, each word having a plurality of bits, a word from the memory being supplied in response to an address signal, the memory being coupled to operate in response to a first clock signal, the first clock signal causing selected interconnections of the memory to change state and thereby consume power;
a selection circuit coupled to receive a last address signal representing a last word selected in the memory and connected to receive at least first and second address signals from the programmable memory, and coupled to receive signals from an external circuit, the selection circuit selecting one of the last address, the first address or the second address in response to the signals from the external circuit, the selection circuit being coupled to operate in response to a second clock signal; and
a clock circuit coupled to the selection circuit for detecting when the signal selecting one of the words in the programmable memory changes, the clock circuit disabling the first clock signal when the signal selecting one of the words in the programmable memory remains unchanged from a previous state to thereby prevent the selected interconnections of the memory not to change state and thereby reduces power consumption, and enabling the first clock signal when the signal selecting one of the words in the programmable memory changes to a new state.

7. A state machine as in claim 6 wherein the programmable memory comprises a read only memory.

8. A state machine comprising:
a programmable memory storing a plurality of words, each word having a plurality of bits, a word from the memory being supplied in response to an address signal, the memory being coupled to operate in response to a first clock signal, the first clock signal causing selected interconnections in the memory to consume electrical power;
a register coupled to the memory for storing a last word provided from the memory;
a selection circuit coupled to receive a last address signal representing a last word selected in the memory and connected to receive at least first and second address signals from the programmable memory, the selection circuit being coupled to operate in response to a second clock signal and in response to a selection signal;

a control circuit coupled to receive signals from an external circuit, the control circuit providing the selection signal which selects one of the last address, the first address or the second address in response to the signals from the external circuit, the control circuit being coupled to operate in response to a second clock signal; and a clock circuit coupled to the control circuit to receive the selection signal and detect when the selection signal selecting one of the words in the programmable memory changes, the clock circuit disabling the first clock signal when the selection signal selecting one of the words in the programmable memory remains unchanged from a previous state to thereby stop the selected interconnections in the memory from consuming electrical power, and enabling the first clock signal when the selection signal selecting one of the words in the programmable memory changes to a new state.

9. A state machine comprising:

a memory storing a plurality of words representative of states of the state machine, each word having a plurality of bits, a word from the memory being supplied in response to a selection signal, the memory connected to receive a first clock signal, the first clock signal causing selected interconnections in the memory to receive or not receive power as determined by presence or absence of the first clock signal, respectively, at least one bit in each word indicative of whether a next word to be addressed is a same word as has previously been addressed, or is a different word;

a first plurality of external input terminals for receiving information from an external circuit;

a control circuit having a plurality of input terminals, at least some of which are coupled to the external input terminals to receive the information therefrom, the control circuit supplying a first output signal; and a clock circuit connected to receive the first output signal and connected to receive a signal representative of the at least one bit indicative of whether a next word to be addressed is the same word or a different word, the clock circuit disabling the first clock signal and thereby reducing power consumption when the at least one bit indicates that the same word is to be selected.

10. A state machine as in claim 9 wherein:

the memory is also connected to supply some of the bits of each word selected to a selection circuit; and the control signal determines whether the selection circuit selects either (1) the same word that it selected in the immediately previous selection, or (2) whether to use the bits from the memory as a next address for a word in the memory.

11. A state machine as in claim 10 wherein the memory further comprises a register which stores a word from the memory which has been most recently supplied in response to an address signal.

12. A state machine as in claim 9 wherein the memory supplies bits to provide a first address and a second address to a selection circuit, and the selection circuit selects one of (1) the same word that it selected in the immediately previous selection, or (2) one of the first address and the second address.

* * * * *